United States Patent
Yamamoto et al.

(10) Patent No.: US 12,486,171 B2
(45) Date of Patent: Dec. 2, 2025

(54) METHOD FOR PRODUCING ALUMINUM NITRIDE POWDER, ALUMINUM NITRIDE POWDER, AND PACKAGE

(71) Applicant: Tokuyama Corporation, Shunan (JP)

(72) Inventors: Yasuyuki Yamamoto, Shunan (JP); Hideki Satou, Shunan (JP)

(73) Assignee: Tokuyama Corporation, Shunan (JP)

( * ) Notice: Subject to any disclaimer, the term of this patent is extended or adjusted under 35 U.S.C. 154(b) by 601 days.

(21) Appl. No.: 17/797,741

(22) PCT Filed: Jan. 22, 2021

(86) PCT No.: PCT/JP2021/002242
§ 371 (c)(1),
(2) Date: Aug. 5, 2022

(87) PCT Pub. No.: WO2021/157388
PCT Pub. Date: Aug. 12, 2021

(65) Prior Publication Data
US 2023/0137083 A1      May 4, 2023

(30) Foreign Application Priority Data

Feb. 6, 2020 (JP) ................. 2020-018829

(51) Int. Cl.
*C01B 21/072*      (2006.01)
(52) U.S. Cl.
CPC ...... *C01B 21/0722* (2013.01); *C01P 2004/61* (2013.01); *C01P 2006/80* (2013.01)
(58) Field of Classification Search
CPC ............. C01B 21/0722; C01P 2004/61; C01P 2006/80
See application file for complete search history.

(56) References Cited

U.S. PATENT DOCUMENTS

| | | | |
|---|---|---|---|
| 5,649,278 A | 7/1997 | Dunmead et al. | |
| 5,710,382 A | 1/1998 | Dunmead et al. | |
| 6,986,875 B2 * | 1/2006 | Miura | C01B 21/0722 |
| | | | 423/412 |
| 2012/0258310 A1 | 10/2012 | Watanabe et al. | |

FOREIGN PATENT DOCUMENTS

| | | |
|---|---|---|
| CN | 1321621 A | 11/2001 |
| CN | 1456495 A | 11/2003 |
| CN | 1159263 C | 7/2004 |
| JP | H03199168 A | 8/1991 |
| JP | H0781909 A | 3/1995 |
| JP | H07187619 A | 7/1995 |
| JP | H07309611 A * | 11/1995 |
| JP | H108506794 A | 7/1996 |
| JP | H08508460 A | 9/1996 |
| JP | 2000016805 A | 1/2000 |
| JP | 2012193054 A | 10/2012 |
| JP | 2017149592 A | 8/2017 |
| WO | 9419275 A1 | 9/1994 |

* cited by examiner

*Primary Examiner* — Anthony J Zimmer
*Assistant Examiner* — Annette Phan
(74) *Attorney, Agent, or Firm* — The Webb Law Firm

(57) ABSTRACT

To produce aluminum nitride in the form of a lump that can easily be broken down by light pulverization, which could not be obtained by a conventional combustion synthesis method. A method for producing aluminum nitride powder by a combustion synthesis method using a metallic aluminum powder, characterized in that a powder mixture in which an aluminum nitride powder having an average primary particle diameter of 3 μm or less as a diluent is mixed with a metallic aluminum powder in a ratio of 150 to 400 parts by mass of the aluminum nitride powder relative to 100 parts by mass of the metallic aluminum powder, is ignited to combust in a nitrogen atmosphere.

5 Claims, No Drawings

METHOD FOR PRODUCING ALUMINUM NITRIDE POWDER, ALUMINUM NITRIDE POWDER, AND PACKAGE

CROSS-REFERENCE TO RELATED APPLICATIONS

This application is the United States national phase of International Application No. PCT/JP2021/002242 filed Jan. 22, 2021, and claims priority to Japanese Patent Application No. 2020-018829 filed Feb. 6, 2020, the disclosures of which are hereby incorporated by reference in their entirety.

BACKGROUND OF THE INVENTION

Field of the Invention

The present invention relates to an industrial method for producing an aluminum nitride powder that is useful for sintered body applications.

Description of Related Art

Due to its excellent properties such as high electrical insulation, high plasma resistance, and high thermal conductivity, aluminum nitride is broadly used for example in insulation/heat dissipation substrates and materials used in semiconductor production apparatuses. These are produced by molding an aluminum nitride powder, to which a sintering auxiliary is added if needed, with the use of an organic binder, and thereafter by degreasing and sintering the obtained molding under ordinary pressure or under pressurized conditions. When yttrium oxide which is a typical sintering auxiliary is used, high thermal conductivity is achieved since yttrium oxide traps impurity oxygen contained in the aluminum nitride.

By the way, there are known examples of general industrial methods for producing an aluminum nitride powder, specifically a reduction nitriding method in which a powder mixture made up of an aluminum oxide powder and a carbon powder is heated to a high temperature in nitrogen, and a direct nitriding method in which metallic aluminum and nitrogen are reacted at a high temperature.

Among the methods, the direct nitriding method that is industrially performed is a method such that a nitriding reaction of metallic aluminum is performed by external heating. Since the aluminum nitride powder thereby obtained includes coarse particles formed by fusion bonding due to heat generated during the reaction, a pulverization treatment is ordinarily performed. Since the pulverization treatment tends to cause increased metallic impurities or increased surface oxygen, a sintered body of the aluminum nitride powder prepared by the direct nitriding method is accompanied by the formation of lattice defects being attributable to those impurities, which causes reduced thermal conductivity. Moreover, there is a concern that moldability will deteriorate due to amorphous particles obtained by the pulverization.

In contrast, compared with an aluminum nitride powder obtained by the direct nitriding method, an aluminum nitride powder obtained by the reduction nitriding method has an average particle diameter of approximately 1 μm and includes less coarse particles, and moreover it has a near spherical particle form and high purity. Thus, such an aluminum nitride powder is characterized by excellent moldability and sintering properties and by the tendency of achieving high thermal conductivity when being sintered.

However, since the reduction nitriding method requires treatments such as a treatment of mixing carbon with aluminum oxide and a decarbonization treatment of remaining carbon, the direct nitriding method is advantageous in terms of raw material cost and energy cost, and moreover industrially enables continuous production. Thus, the direct nitriding method that enables the production of an aluminum nitride equivalent to the aluminum nitride obtained by the reduction nitriding method has been desired.

A combustion synthesis method is known as an example of the direct nitriding method. This is a method for synthesizing aluminum nitride by igniting a part of a raw material powder layer made up of metallic aluminum in a nitrogen atmosphere and by propagating the heat of reaction generated by the reaction below to the above powder layer to progress a nitriding reaction.

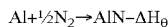

In the reaction formula, $[-\Delta H_{74}] = 320$ KJ/mol, and this heat generation is the driving force for the combustion synthesis reaction.

Known examples of the above method for producing aluminum nitride by a combustion synthesis method using metallic aluminum are those described in JPH 07309611 A (Patent Literature 1) and JP 2000016805 A (Patent Literature 2). These documents disclose performing a combustion synthesis method by adding an aluminum nitride powder as a diluent with metallic aluminum.

JPH 0781909 A (Patent Literature 3) discloses a method for producing silicon nitride by a combustion synthesis method, describing adjusting the bulk density of a powder mixture to be low, the powder mixture being made up of a silicon nitride powder as a diluent (aggregates) and a metallic silicon powder, in order to prevent synthesized silicon nitride from being obtained as stiff lumps.

SUMMARY OF INVENTION

Technical Problem

However, aluminum nitride obtained by the above combustion synthesis method using metallic aluminum has been confirmed to have a problem in which such aluminum nitride is obtained in a stiffly fusion bonded lump state depending on production conditions even though a diluent is used to reduce bulk density.

For this reason, the thus-obtained aluminum nitride must essentially be pulverized when being used as a raw material for sintered bodies.

Since the crushed surface generated by pulverization is easily oxidized, an oxide layer is formed on the surface of the aluminum nitride particles, which causes an increase in the oxygen content of the aluminum nitride powder.

Thus, when such an aluminum nitride powder is calcined as a raw material, there is a problem in which an aluminum nitride sintered body having required properties such as excellent heat and electrical properties is difficult to obtain.

Solution to Problem

As a result of earnest study in response to the problems involved in prior art, the present inventors found that by performing a combustion synthesis reaction using specific aluminum nitride particles as a diluent under predetermined conditions, aluminum nitride is obtained as a lump made up of loosely aggregated primary particles with a particle diameter of a few micrometers, and that the thus-obtained aluminum nitride can be processed into particles having an appropriate size for example by light pulverization that is performed without media for pulverization (this operation may hereinafter be referred to as "disaggregation"), by which the above problems can completely be resolved.

In other words, the method for producing an aluminum nitride powder according to the present invention is characterized in that in a method for producing aluminum nitride powder by a combustion synthesis method using a metallic aluminum powder, a powder mixture in which an aluminum nitride powder having an average primary particle diameter of 3 μm or less as a diluent is mixed with a metallic aluminum powder in a ratio of 150 to 400 parts by mass of the aluminum nitride powder relative to 100 parts by mass of the metallic aluminum powder, is ignited to combust in a nitrogen atmosphere.

In the above production method, the metallic aluminum powder preferably has an average particle diameter of 1 μm or greater and less than 10 μm.

Moreover, the powder mixture preferably has a bulk density in a range of 0.6 to 0.9 g/cm$^3$.

It is preferred that an aluminum nitride lump obtained by the combustion is disaggregated so as to have a size with an average particle diameter exceeding the average primary particle diameter of aluminum nitride particles constituting the lump but being 20 μm or less, and thereafter a part thereof is used as the diluent.

Moreover, it is preferred that the powder mixture being charged in a layered state into a flat box made of a heat resistant material that has a bottom area of 0.3 m$^2$ or greater, is ignited to combust the metallic aluminum powder.

It is preferred that an heat-insulating layer is formed on the bottom face of the flat box.

An aluminum nitride powder according to the present invention is characterized by comprising aggregated particles made up of aluminum nitride primary particles having an average primary particle diameter of 3 μm or less and a crushing strength of 300 MPa or less, and by having an average particle diameter exceeding the above average primary particle diameter but being 20 μm or less.

The above aluminum nitride powder preferably has a carbon concentration of 300 ppm by mass or less.

The above aluminum nitride powders can be obtained by the above production method. In addition, the aluminum nitride powder according to the present invention preferably has a packaging form being charged into a packaging bag made of resin.

Advantageous Effects of Invention

According to the present invention, aluminum nitride in a lump state which can easily be broken down by light pulverization (namely disaggregation) is obtainable, where such aluminum nitride had been impossible to obtain by a conventional combustion synthesis method.

An aluminum nitride powder obtained by disaggregating the above aluminum nitride lump until it has an average particle diameter exceeding the average primary particle diameter of aluminum nitride particles constituting the lump but being 20 μm or less, is an aggregate made up of primary particles having an average primary particle diameter of 3 μm or less. Such aggregate is characterized by having a small cohesion (namely small crushing strength) and an extremely low oxygen concentration since it has less activated surfaces generated by pulverization.

The aluminum nitride powder according to the present invention in the state of such aggregates has little dusting and is easily handleable, and simultaneously, when being used as a raw material for sintered bodies, it is easily disaggregated by shearing when being mixed with an organic binder even if it is used as is without pulverization. Thus, the aluminum nitride powder according to the present invention enables calcination with high processing efficiency and production efficiency.

DESCRIPTION OF THE INVENTION

Embodiments of the present invention is described below.
Method for Producing Aluminum Nitride Powder As a metallic aluminum powder itself that is used as a raw material, a known one or a commercialized one may be used as is. Methods for producing the metallic aluminum powder are also not particularly limited and those obtained by any production methods may be used. The purity of the metallic aluminum powder is not particularly limited, but when the properties of the obtained products such as thermal conductivity are taken into consideration, a purity of 99.9% by mass or greater (with the proviso that oxygen content is neglected in the calculation) is ordinarily preferred.

The metallic aluminum powder ordinarily has an average particle diameter of 1 μm or greater and less than 10 μm, preferably from 1.5 to less than 10 μm. When a metallic aluminum powder having a large average particle diameter is used, a large amount of an aluminum nitride powder with a large particle diameter which is difficult to disaggregate may remain. In contrast, a metallic aluminum powder with a small average particle diameter exhibits low handleability and the metal tends to be oxidized.

The oxygen content in the metallic aluminum powder (oxygen content) may appropriately be determined in accordance with conditions such as the applications of final products and reaction conditions, but the oxygen content is ordinarily approximately 0.05 to 1% by mass and is particularly preferably 0.1 to 0.6% by mass. When the above oxygen content is less than 0.05% by mass, metallic aluminum powders tend to cause fusion bonding during the reaction, leading to insufficiency of nitrogen gas supply to the powder. As a result, a nitriding ratio may be reduced. In contrast, when the above oxygen content exceeds 1% by mass, oxidized films formed on a particle surface in a metallic aluminum powder may inhibit the progress of a nitriding reaction.

According to the present invention, an aluminum nitride powder as a diluent is mixed in together with the above metallic aluminum powder.

The desirable average primary particle diameter of the aluminum nitride powder is 3 μm or less, preferably 2 μm or less. When the aluminum nitride powder used as a diluent has an average primary particle diameter exceeding the above range, metallic aluminum particles or generated aluminum nitride particles cause significant fusion bonding during the reaction, and as a result, aluminum nitride is obtained as a stiff lump and the object of the present invention cannot be achieved.

According to the present invention, the state of the aluminum nitride powder used as the diluent is not particularly limited as long as the average primary particle diameter is in the above range. For example, an aluminum nitride powder in which primary particles are dispersed, an aluminum nitride powder as aggregated particles in which primary particles are aggregated, or a mixture of the above aluminum nitride powders is used without particular limitation.

The above aluminum nitride powder is specifically exemplified by an aluminum nitride powder obtained by a reduction nitriding method. The above aluminum nitride powder obtained by a reduction nitriding method is preferred since therein particles having an average primary particle diameter of approximately 1 μm are generally present in a dispersed state. In addition, it is also a preferred embodiment in which a part of an aluminum nitride powder obtained by the method according to the present invention is used as a diluent. The above aluminum nitride powder can be obtained as aggregated primary particles having an average primary particle diameter of 3 μm or less as described later, and as a diluent, the thus-obtained aluminum nitride powder may be used as is.

The most preferred embodiment of the present invention is such that as a diluent, an aluminum nitride powder obtained by a reduction nitriding method is used at the beginning of the reaction and thereafter a part of the aluminum nitride powder obtained by the production method according to the present invention is used.

The reaction can be controlled by adjusting the mixing ratio of a metallic aluminum powder to an aluminum nitride powder, and the desirable mix ratio is 150 to 400 parts by mass, preferably 200 to 350 parts by mass of an aluminum nitride powder relative to 100 parts by mass of a metallic aluminum powder.

The above mixing ratio, as well as the above specified average primary particle diameter, leads a sufficiently controlled reaction, and thereby easily disaggregated aluminum nitride lumps can be obtained and production efficiency of them can be elevated.

According to the present invention, a known method is employed without particular limitation in order to mix a metallic aluminum powder with an aluminum nitride powder, but a mixing method using a ball mill, a V blender, or a ribbon mixer for example is generally employed.

In addition, the bulk density of the powder mixture may be appropriately determined in accordance with conditions such as the particle size of the powder and reaction conditions. The desired bulk density is ordinarily 0.6 to 0.9 g/cm$^3$, preferably 0.7 to 0.9 g/cm$^3$. Since the bulk density in the above range leads sufficient nitrogen gas supply into the powder mixture, the combustion proceeds sufficiently and the amount of unreacted metallic aluminum is reduced. In addition, easily-disaggregated aluminum nitride lumps can be obtained.

In the production method according to the present invention, a sufficient nitrogen source required for the reaction must be present on a powder surface in a portion where the reaction progresses in order to progress the chain reaction of the metallic aluminum powder. Thus, a nitrogen-including atmosphere that includes 1.0 to 10 atm, preferably 1 to 8 atm nitrogen is preferred. As the nitrogen-including atmosphere, nitrogen or ammonia, or a non-oxidative gas including the same may industrially be used.

In the production method according to the present invention, conditions and methods for a combustion synthesis reaction are not particularly limited as long as the above powder mixture is used under the above nitrogen atmosphere conditions.

For example, a nitriding reaction may be progressed in a pressure apparatus in which nitrogen pressure is appropriately adjusted, by igniting a part of a metallic aluminum powder contained in a reactor made of a heat resistant material in the form of a flat box.

In this embodiment, it is desirable that the reaction is progressed while nitrogen continues to be supplied anew into the atmosphere in the reactor, in order to maintain a constant nitrogen pressure or to prevent a nitrogen pressure from dropping below a predetermined pressure.

In addition, the ignition method is not particularly limited and any method by which a combustion synthesis reaction can be started may be employed.

The method is exemplified by an embodiment in which a resistor such as carbon embedded in a metallic aluminum powder is heated, an embodiment in which a publicly known ignition agent embedded in a metallic aluminum powder is ignited, and an embodiment in which a metallic aluminum powder is irradiated with an electron beam or a laser.

In order to prevent excessively increased reaction temperature, a cooling means may be provided in the vicinity of the reactor. The cooling means may be an air-cooling system or a water-cooling system.

A preferred embodiment for industrially performing the present invention is such that a container having a bottom area of 0.3 m$^2$ or greater, specifically a flat box made of a heat resistant material such as carbon is used as a reactor. In addition, the above flat boxes are preferably stacked in a layered state while ensuring nitrogen supply spaces. Then, the powder mixture is charged into the flat boxes and is ignited to effectuate the combustion reaction of a metallic aluminum powder.

The powder mixture charged into the above flat boxes is preferably in a form of a powder layer with a thickness of 10 to 80 mm. When the thickness of the powder mixture is in the above range, the nitriding ratio is not decreased at a lowered combustion temperature since the heat value is sufficiently higher than the heat release. In addition, the nitriding ratio in the lowermost part of the powder layer can be increased since nitrogen supplied from a surface of a powder layer sufficiently reaches the lowermost part of the powder layer.

When the method according to the present invention is industrially performed, it is preferred to use a reactor having a bottom area of 0.3 m$^2$ or greater, preferably 0.5 to 3 m$^2$ as the reactor. When a reactor having such a large area is used, an heat-insulating layer is preferably formed on a bottom face in order to prevent heat loss from the peripheral wall of the reactor, particularly from the bottom face, and efficiently propagate reaction heat in the powder mixture.

As a material constituting the above heat-insulating layer, any material may be employed as long as it is not involved in the reaction. Such material is specifically exemplified by aluminum nitride and boron nitride, and aluminum nitride is particularly preferred.

An embodiment of the heat-insulating layer is exemplified by an embodiment in which the heat-insulating layer in a powder state is present as a spreading powder layer, or an embodiment in which the heat-insulating layer formed into a plate shape is provided on a bottom face part. The heat-insulating layer formed into a plate shape is not limited to a dense plate-formed one, and a porous plate or a perforated plate may also be used. When a heat-insulating layer in a powder state is formed, an aluminum nitride powder obtained by the method according to the present invention, which is not an impurity even if being mixed into a product, is preferably used. With respect to a heat-insulating layer formed into a plate shape, such a heat-insulating layer may also be provided on a side of the reactor. In addition, when an aluminum nitride powder is used, a preferred embodiment is such that a heat-insulating layer is formed by making the aluminum nitride powder present on a surface layer of a powder mixture charged into the reactor.

The above heat-insulating layer appropriately has a thickness of approximately 5 to 10 mm.

The aluminum nitride obtained by the present invention is recovered as a block lump, but due to its weak aggregation, an aluminum nitride powder can be easily obtained by disaggregation.

Methods for the above disaggregation are not particularly limited, and a disaggregation means using a medium such as a ball mill, a vibration mill, or an attritor mill may be employed. However, a disaggregation means using no medium is preferably employed since the aggregation is not strong. A specific example is a method using a pulverization apparatus such as a jet mill, a mass-colloider, or a vibration mill using no ball.

The degree of the above disaggregation is not particularly limited, but the aluminum nitride lump obtained by the reaction is preferably disaggregated so as to have a size with an average particle diameter exceeding the average primary particle diameter of the aluminum nitride particles constituting the aluminum nitride lump but being 20 μm or less, preferably a size with an average particle diameter of 4 to 20 μm, more preferably a size with an average particle diameter of 5 to 15 μm. By the disaggregation to the above size, an aluminum nitride powder causing no dusting and having excellent handleability is obtained.

Since the thus-obtained aluminum nitride powder is one having a primary particle diameter of 3 μm or less as described later, such an aluminum nitride powder may appropriately be used as a raw material for sintering.

With respect to the above aluminum nitride powder having the above primary particle diameter, a part thereof may be used as a diluent with no problem in the production method according to the present invention.

The production method according to the present invention utilizes a combustion synthesize reaction in which heating from outside (namely forced heating) is not required. Since a specific diluent is used, aggregation of the aluminum nitride is weak and high quality aluminum nitride can be produced by an easy disaggregation treatment.

In virtue of the above effects, the production method according to the present invention can achieve significantly low cost and high efficiency compared with conventional production methods.

As described above, the method for producing aluminum nitride according to the present invention is suitable for industrial-scale production, and thereby aluminum nitride can be provided at a low price.

[Aluminum Nitride Powder]

An aluminum nitride powder obtained by the above method according to the present invention has an average primary particle diameter being as small as 3 μm or less and is obtained by appropriately disaggregating an aluminum nitride lump obtained as a weak aggregate. Thus, the aluminum nitride powder is obtained as aggregated particles which maintain appropriate aggregation state while maintaining an average primary particle diameter equivalent to that of an aluminum nitride powder obtained by a conventional reduction nitriding method.

Thus, the aluminum nitride powder has high sintering properties derived from the above aluminum nitride powder and can be treated as aggregated particles being aggregated by an appropriate strength, furthermore, the aluminum nitride powder has little dusting.

Such an aluminum nitride powder is advantageous in the aspect of working environment.

In other words, the present invention provides an aluminum nitride powder characterized by including aggregated particles of aluminum nitride primary particles having an average primary particle diameter of 3 μm or less, the aggregated particles having a size with an average particle diameter exceeding the above average primary particle diameter but being 20 μm or less, preferably being from 4 to 20 μm, more preferably being from 5 to 15 μm, and a crushing strength of 300 MPa or less.

The aluminum nitride powder according to the present invention preferably has a carbon concentration of 300 ppm by mass or less, preferably 200 ppm by mass or less.

The aluminum nitride powder according to the present invention has an oxygen content of 1.3% by mass or less, preferably 1.0% by mass or less. According to the present invention, the average primary particle diameter is measured with a scanning electron microscope and the average particle diameter of aggregated particles is measured with a particle size distribution analyzer (MT3000 II EX, produced by MicrotracBEL Corporation).

Aggregated particles of aluminum nitride primary particles as described in the present invention, when being supplied for the application of sintered bodies, become an aluminum nitride powder which is easy to handle and is well dispersed in a solvent. In addition, the aluminum nitride powder forms fewer new surfaces attributable to the collapse of particles due to low crushing strength ascribed to aggregated particles made up of weakly aggregated particles, and the powder has a low oxygen concentration when being dispersed in a solvent. Thus, a sintered body made from the aluminum nitride powder has high thermal conductivity.

Such an aluminum nitride powder can be produced for example by the above production method.

The aluminum nitride powder, which is produced by a combustion synthesis reaction, inherently has a low carbon concentration in the powder.

Even if an aluminum nitride powder produced by a reduction nitriding method is used as a diluent for starting-up, the carbon concentration sequentially becomes lower as the generated aluminum nitride is repeatedly used as a diluent.

The aluminum nitride powder according to the present invention having such a low carbon concentration exhibits extremely high whiteness.

In addition, since such an aluminum nitride powder according to the present invention may be shipped as aggregates having the above average particle diameter, it has high handleability due to no dust scattering, tends to be disaggregated, and is easily dispersed due to the low crushing strength during work of mixing with a resin or a solvent.

For this reason, the aluminum nitride powder according to the present invention can be transferred in a form of being charged into a packaging bag made of resin such as a drum can, a PET can, a flexible container, or a paper bag. The present invention can also provide such a package.

EXAMPLES

The features of the present invention are specifically described with reference to, but not limited to, examples below.

Example 1

An aluminum nitride powder produced by a reduction nitriding method, having an average primary particle diameter of 1 μm, an oxygen content of 0.8% by mass, and an amount of impurities excluding oxygen of 0.1% by mass was mixed with a metallic aluminum powder having an average particle diameter of 8 μm, an oxygen content of 0.05% by mass, and an amount of impurities excluding oxygen of 0.1% by mass, in a ratio of 350 parts by mass of the aluminum nitride powder relative to 100 parts by mass of the metallic aluminum powder to give a powder mixture, which was charged so as to form a uniform layer into a carbon-made flat reactor having a bottom area of 0.4 m², and the reactor was laid in a pressure container. Nitrogen was introduced into the pressure container until the pressure inside reached 6 atm, ignition was performed by feeding 700 W of power to a ribbon heater for 5 seconds to start a nitriding reaction. After the reaction, the obtained aluminum nitride lumps were disaggregated with a vibration mill without balls to give an aluminum nitride power having a $D_{50}$ of 8.2 µm, an average primary particle diameter of 1 µm, and a crushing strength of 250 MPa. The obtained aluminum nitride powder had an oxygen concentration of 0.7% by mass.

The aluminum nitride powder obtained by the above method was used as a diluent, a combustion synthesis reaction was repeated five times in the same manner as described above, and disaggregation was performed in the same manner to give an aluminum nitride powder. As a result, an aluminum nitride powder was obtained having an average particle diameter, an average primary particle diameter, a crushing strength, and an oxygen concentration nearly equivalent to those of the above aluminum nitride powder. The aluminum nitride powder obtained by the five-time repeating use of the formed aluminum nitride powder as a diluent had a carbon concentration reduced to 180 ppm.

5 parts by mass of an yttrium oxide powder and 10 parts by mass of a binder were added to 100 parts by mass of the above aluminum nitride powder, a solvent was added thereto and was mixed, and the obtained slurry was molded into a sheet.

The obtained sheet molding was cut out into a predetermined size and was sintered at a temperature of 1,800° C. to give a sintered body. The density and thermal conductivity of the obtained sintered body were measured to be 3.321 g/cm³ and 181 W/mK, respectively.

Example 2

An aluminum nitride powder was obtained in the same manner as described in Example 1 except for performing the disaggregation after the nitriding reaction using a jet mill instead of a vibration mill. The obtained aluminum nitride powder was molded into a sheet, which was thereafter sintered to give a sintered body in the same manner as described in Example 1, and evaluation was performed. The obtained powder had a $D_{50}$ of 6.4 µm, an average primary particle diameter of 1 µm, an oxygen concentration of 0.8% by mass, and a crushing strength of 240 MPa. The density and thermal conductivity of the sintered body were measured to be 3.34 g/cm³ and 180 W/mk, respectively.

Example 3

An aluminum nitride powder was obtained in the same manner as described in Example 2 except for performing the disaggregation after the nitriding reaction using a jet mill with a smaller disaggregation energy. The obtained aluminum nitride powder was molded into a sheet, which was thereafter sintered to give a sintered body in the same manner as described in Example 1, and evaluation was performed. The obtained powder had a $D_{50}$ of 10.4 µm, an average primary particle diameter of 1 µm, an oxygen concentration of 0.8% by mass, and a crushing strength of 240 MPa. The density and thermal conductivity of the sintered body were measured to be 3.34 g/cm³ and 179 W/mk, respectively.

Comparative Example 1

An aluminum nitride powder was obtained in the same manner as described in Example 1 except for preparing a powder mixture by mixing an aluminum nitride powder for dilution with a metallic aluminum powder in a ratio of 100 parts by mass of the aluminum nitride powder relative to 100 parts by mass of the metallic aluminum powder. The obtained aluminum nitride powder was molded into a sheet, which was thereafter sintered to give a sintered body in the same manner as described in Example 1, and evaluation was performed. The obtained powder had a $D_{50}$ of 26 µm, an average primary particle diameter of 5 µm, an oxygen concentration of 0.6% by mass, and a crushing strength of 340 Mpa. The density and thermal conductivity of the sintered body were measured to be 2.79 g/cm³ and 95 W/mk, respectively.

Using the aluminum nitride powder obtained above as a diluent, a nitriding reaction was similarly attempted. However, flame did not propagate from an ignition agent and the reaction did not progress.

Comparative Example 2

A nitriding reaction was performed in the same manner as described in Example 1 except for preparing a powder mixture by mixing an aluminum nitride powder for dilution having an average particle diameter of 15 µm to a metallic aluminum powder in a ratio of 300 parts by mass of the aluminum nitride powder relative to 100 parts by mass of the metallic aluminum powder. However, flame did not propagate from an ignition agent and the reaction did not progress.

The invention claimed is:

1. A method for producing an aluminum nitride powder by a combustion synthesis method, the method comprising:
    mixing an aluminum nitride powder having an average primary particle diameter of 3 µm or less as a diluent with a metallic aluminum powder in a ratio of 150 to 400 parts by mass of the aluminum nitride powder relative to 100 parts by mass of the metallic aluminum powder to form a powder mixture,
    igniting the powder mixture to combust in a nitrogen atmosphere to obtain an aluminum nitride lump,
    disaggregating the aluminum nitride lump to form the aluminum nitride powder, wherein the aluminum nitride powder comprises aggregated particles of aluminum nitride primary particles having an average primary particle diameter of 3 µm or less, wherein the aggregated particles have an average particle diameter that exceeds the average primary particle diameter but is 4 µm to 20 µm,
    wherein a part of the aluminum nitride powder obtained after disaggregating is used as the diluent when the process is repeated.

2. The method for producing an aluminum nitride powder according to claim 1, wherein the metallic aluminum powder has an average particle diameter of 1 µm or greater and less than 10 µm.

3. The method for producing an aluminum nitride powder according to claim 1, wherein the powder mixture has a bulk density in a range of 0.6 to 0.9 g/cm³.

4. The method for producing an aluminum nitride powder according to claim 1, wherein the powder mixture is charged in a layered state into a reactor in a shape of a box, wherein the reactor is made of a heat resistant material and has a bottom area of 0.3 m² or greater, and the powder mixture is ignited to combust the metallic aluminum powder.

5. The method for producing an aluminum nitride powder according to claim 4, wherein a heat-insulating layer is formed on a bottom face of the reactor.

* * * * *